UNITED STATES PATENT OFFICE.

WALTER J. BYRNE, OF RUSSELLVILLE, KENTUCKY.

IMPROVEMENT IN PAINT.

Specification forming part of Letters Patent No. 121,330, dated November 28, 1871.

*To all whom it may concern:*

Be it known that I, WALTER J. BYRNE, of Russellville, in the county of Logan and State of Kentucky, have invented a new and Improved Paint; and I declare the following to be a full, clear, and exact description thereof.

The paint is prepared in the following manner: To six pounds of pulverized carbonate of lime I add one pint of linseed-oil. This reduces the lime to the consistency of ordinary putty, and forms the base for the paint. I then add two quarts of dissolved caoutchouc or India rubber, which is prepared by mixing the gum with benzine in the proportion of about four ounces of the former to three gallons of the latter. The whole is then allowed to stand and digest for about twelve days at a temperature in the neighborhood of 70° Fahrenheit. It is then agitated until the mixture becomes homogeneous, when it is ready for use as a white paint, and is applied with a brush in the ordinary manner.

If a colored paint is required, it can readily be obtained by the admixture of any of the ordinary pigments. They should first be ground with a small quantity of linseed-oil, sufficient to thoroughly saturate them, and then added to the mixture above described in quantities sufficient to produce the desired result.

The paint thus prepared is beautiful in appearance and is more durable than any other with which I am acquainted. It is not affected by the action of light, heat, or moisture. Three coats of it cover and protect the surface of the wood or other material as completely as five or six coats of the ordinary paints. It adheres with great tenacity, and has the peculiar quality of polishing by rubbing until its surface is as brilliant as if it had been covered with a fine varnish. A moment's rubbing with sand-paper, a woolen rag, or any other similar substance, is all that is necessary to produce this result. After it has been polished in this manner it may be washed with soap and water or other detergent without injury, and may be exposed to the elements for any length of time without impairing its luster. The cost of the paint is trifling compared with that of the paints now in general use.

While the proportions above stated are those proved by a long and thorough course of experiments to be best adapted to the purpose, yet, of course, I allow myself some latitude in regard to them. Any kind of oil that will answer for mixing a paint may be employed instead of linseed; and instead of the benzine as a solvent for the rubber, spirits of turpentine, or perhaps some other solvent, may be used. So, too, instead of the carbonate of lime I may use lime itself (oxide of calcium) or any of its salts which will produce the desired result.

I do not claim the mixture of lime with linseed-oil; nor the dissolving of India rubber in the solvents referred to; but What I do claim as my invention is—

Paint prepared by uniting dissolved India rubber with lime or any of its salts and oil, substantially as herein described.

W. J. BYRNE.

Witnesses:
CHARLES F. BROWN,
W. L. SAVOY. (107)